United States Patent
Peczalski et al.

(10) Patent No.: US 9,482,573 B2
(45) Date of Patent: Nov. 1, 2016

(54) CONDITION BASED MONITORING SYSTEM BASED ON RADAR SENSOR

(75) Inventors: Andy Peczalski, Eden Prarie, MN (US); Dinkar Mylaraswamy, Fridley, MN (US)

(73) Assignee: Honeywell International Inc., Morris Plains, NJ (US)

(*) Notice: Subject to any disclaimer, the term of this patent is extended or adjusted under 35 U.S.C. 154(b) by 1178 days.

(21) Appl. No.: 13/096,253

(22) Filed: Apr. 28, 2011

(65) Prior Publication Data

US 2011/0288796 A1 Nov. 24, 2011

Related U.S. Application Data

(60) Provisional application No. 61/347,762, filed on May 24, 2010.

(51) Int. Cl.
   G01F 17/00 (2006.01)
   G01H 9/00 (2006.01)

(52) U.S. Cl.
   CPC ..................... G01H 9/00 (2013.01)

(58) Field of Classification Search
   CPC ........................................................ G01H 9/00
   USPC ................... 702/56; 356/28.5; 342/127, 61
   See application file for complete search history.

(56) References Cited

U.S. PATENT DOCUMENTS

| | | | | |
|---|---|---|---|---|
| 4,887,087 A * | 12/1989 | Clearwater | ...................... | 342/61 |
| 5,159,406 A | 10/1992 | Adler et al. | | |
| 5,760,731 A | 6/1998 | Holmes | | |
| 6,489,917 B2 | 12/2002 | Geisheimer et al. | | |
| 6,621,561 B2 | 9/2003 | Holton | | |
| 6,672,167 B2 * | 1/2004 | Buell et al. | ...................... | 73/657 |
| 6,972,846 B2 * | 12/2005 | Lal et al. | ...................... | 356/486 |
| 7,405,814 B2 * | 7/2008 | Muenter | ...................... | 356/28.5 |
| 7,533,572 B2 * | 5/2009 | Twerdochlib | ...................... | 73/657 |
| 7,630,802 B2 | 12/2009 | Breed | | |
| 2003/0014199 A1 * | 1/2003 | Toomey | ...................... | 702/56 |
| 2009/0043441 A1 * | 2/2009 | Breed | ...................... | 701/29 |

FOREIGN PATENT DOCUMENTS

WO  WO-9722891 A1  6/1997

OTHER PUBLICATIONS

Billington, Scott, "A Non-Intrusive Radar-Based Vibration Sensor", PMRC Industrial Advisory Board Meeting—2001, Georgia Institute of Technology, (Oct. 2001), 1 pg.

Binu, S., et al., "Fibre optic displacement sensor for the measurement of amplitude and frequency of vibration", Optics & Laser Technology, 39(8), (Nov. 2007), 1537-1543.

Peczalski, Andrzej, et al., "Advanced Vibration Sensing with Radar—ADVISER", Annual Conference of the Prognostics and Health Management Society, (2010), 1-6.

* cited by examiner

Primary Examiner — John Breene
Assistant Examiner — Stephanie Bloss
(74) Attorney, Agent, or Firm — Schwegman Lundberg & Woessner, P.A.

(57) ABSTRACT

A sensing system comprising a radar-based vibration sensor and processing unit used to collect and process vibration information from a machine of interest. The radar-based vibration sensor obtains vibration data from mechanical operation of a component or series of components in the machine, and may be steered toward specific regions of interest of the machine. The processing unit analyzes the data, and may fuse data from a plurality of vibration sensors, such as radar-based vibration sensors and multiple machine-mounted sensors such as accelerometers. From this analysis, indications related to a status of the mechanical operation of the components in the machine of interest may be provided to relevant users.

18 Claims, 4 Drawing Sheets

CONDITION BASED MONITORING SYSTEM BASED ON RADAR SENSOR

CLAIM OF PRIORITY

This patent application claims the benefit of priority, under 35 U.S.C. Section 119(e), to U.S. Provisional Patent Application Ser. No. 61/347,762, entitled "CONDITION BASED MONITORING SYSTEM BASED ON RADAR SENSOR", filed May 24, 2010, which is hereby incorporated by reference in its entirety.

BACKGROUND

Machines with moving parts need predictive maintenance to lower production costs. As a part of Condition Based Maintenance (CBM), the timing and need for maintenance can be predicted with a condition monitoring system. Vibration sensing using accelerometers is the standard measurement for machine monitoring. These sensors measure vibration at the location where they are attached to the machine.

While accelerometers come in various forms, their basic principles remains the same—make physical contact with the machine being monitored and generate a signal that is proportional to the harmonic motion experienced at the point of contact. Permanently installed accelerometers are often attached to the machine with screws and wired connections. Besides their intrusive nature (designed while the machine is assembled), such sensors cannot be mounted on many moving parts, making it impossible to monitor "locations" that may be critical from a vibration standpoint.

Permanently mounted accelerometers are often complemented with handheld vibration monitoring equipment. However, signals generated from sensors mounted "far away" from a machine pick up background noises such as those generated by a helicopter body. This can obscure important signatures of failing gears or bearings. Further, it may not be safe to approach the machine with an attachable handheld sensor and try to make the sensor head reach the remote location of interest.

SUMMARY

In one specific embodiment, a sensing system comprises a radar-based vibration sensor and processing unit. The radar-based vibration sensor is configured to obtain vibration data from mechanical operation of a component or series of components in a machine of interest. The processing unit is configured to analyze the data obtained by the at least one radar-based vibration sensor, and provide indications related to a status of the mechanical operation of the one or more components in the machine of interest.

In further embodiments, data from multiple vibration sensors may be fused and factored in the processing system, such as data collected from a plurality of radar-based vibration sensors, and a plurality of machine-mounted vibration sensors (i.e., accelerometers). In other further embodiments, a steering system may be configured to direct and steer the radar-based vibration sensor to collect the vibration data from different locations of mechanical operation for the machine of interest. From the indications calculated from the processing unit, various machine health indicators and potential maintenance actions may be suggested.

DETAILED DESCRIPTION

Figure 1:
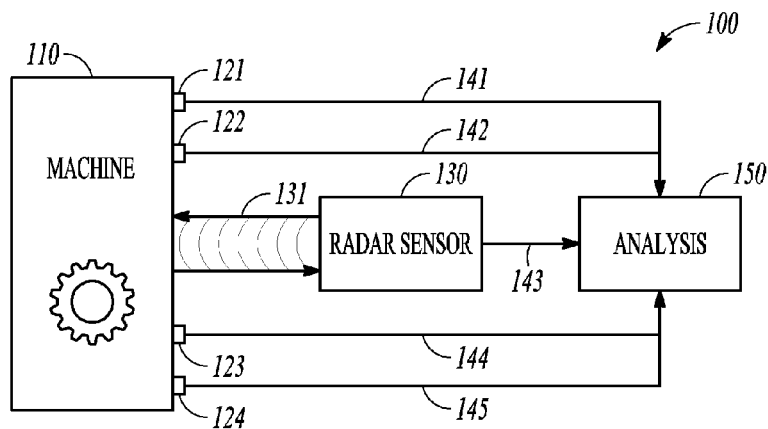
FIG. 1 depicts an example operation of a sensor based system configured for monitoring a selected machine.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical, and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human or enterprise implemented procedures in one embodiment. The software may consist of computer executable instructions stored on computer readable media such as memory or other type of storage devices. Further, such functions correspond to modules, which are software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

As disclosed herein, one or more radar-based displacement sensors may be used to gather vibration information from an operating machine. The radar-based displacement sensor may be steered or directed toward multiple regions of interest on the operating machine to gather vibration information from the multiple regions of interest.

In one embodiment, the data produced from the one or more radar based displacement sensors may be processed in a condition monitoring system or other sensing system that allows monitoring of the entire machine and a plurality of sensing locations. In combination with mounted sensors and backend software to analyze the data, maintenance information and other monitoring data may be extracted from the sensing system and provided to a user for remedial action.

Despite an accelerometer's ability to monitor instrumented parts of the machine, relying on the use of accelerometers in a condition monitoring system or like sensing system may result in a number of location and design limitations (particularly for permanent sensor installation). Further, economic reasons may limit the locations where accelerometers can be installed and deployed.

Tethered accelerometer heads suffer the same limitations as its permanently installed counterpart. That is, tethered sensors need to make mechanical contact with the machine and often require supplemental measurements such as an optical tachometer. Handheld accelerometers can provide a wider range, but their accuracy depends on the skill level of the technician. Further, it may not be safe to approach the machine with an attachable handheld sensor and try to make the sensor head reach the remote location of interest.

Many engineers often would like access to the vibration data from an un-instrumented part of the machine, or would like the ability to change the areas of interest for monitoring. These limitations can be alleviated by use of a non-contact or stand-off measurement sensor in connection with the presently disclosed sensing system.

A sensing system (hardware and software) such as the example system illustrated in FIG. 1 may be used to monitor an entire machine with moving parts, using a scanning radar-based displacement sensor, permanently mounted sensors, and back-end software to enable maintenance related decision making. Structural problems can develop anywhere in the machine and are not restricted to the location where embedded sensors may be located. Collecting data with the use of scanning radar-based vibration sensors provides the ability to monitor large areas of the "entire" machine, while also analyzing well-known weak spots in the machine as necessary for rapid, accurate assessment of machine health.

Specifically, the presently disclosed sensing system may be deployed to monitor a wide variety of rotating machinery and mechanical components within a machine. This rotating machinery may include one or more of an electric motor, pulleys, gearboxes, shafts, bearings, drivelines, and like mechanical parts. Within such rotating machinery, abnormal harmonic readings may indicate rotational misbalance as a result from a failing or misbalanced component.

The sensing system may process these harmonic readings and other temporal and spectral data to detect the status of various operational components. The sensing system may specifically generate health indicators to alert users to warnings and failures such as stator breaks, rotor bending, wiring, shaft misalignment, gear tooth breaks, and bearing spalls. Use of the displacement vibration sensor within the sensing system provides a non-intrusive, non-contact approach to detect failures without adding conventional accelerometers. This not only makes it easy to retrofit legacy machines, but also allows the same apparatus to monitor more than one machine at the same time.

An example sensing system includes several components used to provide sensing measurements and direct operation of sensors as necessary. In one embodiment, the system may include a stand-off sensor that observes the machine for vibration induced displacements, one or more of permanently mounted sensors that provide measurement of machine condition at point locations, a steering system that steers the stand-off sensor to observe specific regions of interest within the machine, a software module that analyzes the data from various sensors, and a decision support module that calculates the machine health indicators and potential maintenance actions.

In one embodiment, the stand-off sensor is a radar based displacement sensor. For example, the stand-off sensor may use Doppler-based radar techniques to transmit and measure signals aimed at a specific object of interest. The stand-off sensor may be electronically or mechanically steered towards the specific object for monitoring. The steering may be either periodic or trigger-based, and driven by any combination of human and automated control. For example, a steering subsystem may be used to position an electromechanically operated phased-array radar antenna within the stand-off sensor.

In connection the presently described sensing system, a non-contact, radar-based sensor may be configured to sense vibration from a considerable distance (e.g., 4 feet), and provide a wide field of view that could be adjusted to monitor the entire machine or specific parts of the machine. Further, the sensor may be tuned to detect only the motion of the machinery and reject background vibration, providing vibration data from under-instrumented parts of the machine without incurring additional costs. This makes acquiring vibration data from previously un-instrumented parts not only cost-effective, but also safe.

Moreover, rejection of background vibration is inherent to the sensor because the radar sensor detects only the motion of the machinery relative to the sensor. The radar antenna of the sensor may also be configured to have a tunable or narrow field of view, such as providing no more than a 10-degree field of view and therefore could be deployed as a handheld or spot sensor.

In summary, a radar-based displacement sensor used in the presently disclosed sensing system transmits RF energy toward a target area to be monitored. The RF energy reflects from metal surfaces and edges within the target area and returns to the sensor. The sensor may be calibrated to reject any movement that is common to the target and the antenna. Further, the sensing system may process and analyze data from a plurality of displacement sensors or in combination with a plurality of fixed accelerometers to identify and reject invalid data. The data produced by the radar-based displacement sensor may be therefore refined or processed at the sensor or within a processing module separate to the sensor.

An embodiment of a sensor based system 100 is illustrated in FIG. 1. Machine 110 may contain a plurality of moving parts or components that are intended to be monitored to ensure proper mechanical operation. A series of accelerometers 121, 122, 123, 124 may be attached to or otherwise directly proximate to various moving components of the machine 110.

A radar sensor 130 may be positioned auxiliary to accelerometers 121, 122, 123, 124, or may be positioned as a portable stand alone sensor. For example, an operator may bring the radar sensor 130 to a factory floor and position it on a tripod at a distance (such as less than four feet) from the machine 110 when suspecting performance issues, or when the machine operation is in need of a period checkup. The sensor 130 may be configured to collect vibration or displacement data for a period of time, such as over a few days, allowing the data collected over this period of time to be analyzed for indicators of possible problems such as motor damage or wear.

Specifically, the radar sensor 130 transmits and receives radar energy 131 to and from the machine 110, collecting vibration data from the whole or a large part of the machine. The vibration data including temporal or spectral data collected from the combination of accelerometers 121, 122, 123, 124 and the radar sensor 130 is then transmitted to an analysis component 150 as represented by lines 141, 142, 144, 145, and 143 respectively. The lines may represent hardwired communication lines, or wireless connections in various embodiments.

A certain measured threshold of change, e.g., an amplitude of velocity or frequency shift/new frequency, may be configured to create or otherwise initiate a request for maintenance within the analysis component 150. Specifically, information from the radar sensor 130 may be collected as a time sampled data or Fast Fourier Transform (FFT) of the data or frequencies and amplitudes of the spectrum peaks. Information from different peaks can be combined, for example, to enable the velocity at the moving parts of the machine to be correlated with the load. The loading condition may be used for the interpretation of the spectral peaks corresponding to vibrations which may shift or broaden for different loads, such as may be measured from bearing vibrations.

Figure 2:
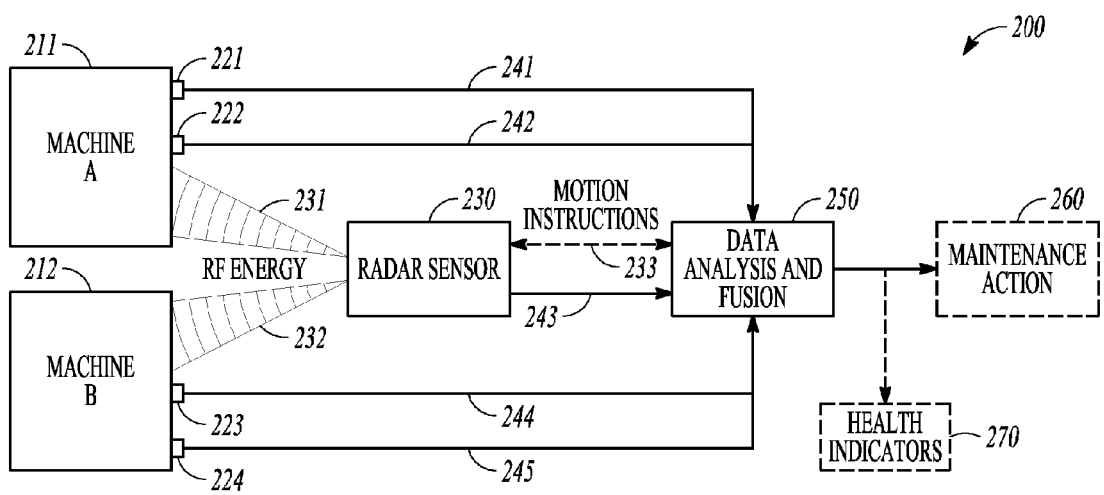
FIG. 2 depicts an example operation of a sensor based system configured for monitoring a plurality of machines.

FIG. 2 illustrates another embodiment providing a configuration of a sensor system 200 configured to monitor operation of multiple machines or components with use of a radar-based sensor. As illustrated, machine A 211 and machine B 212 are monitored with a series of permanently mounted sensors, such as accelerometers 221, 222, and 223, 224 respectively. The radar-based sensor 230 may configured to direct RF energy towards one or both of machine A 211 and machine B 212 as shown in 231 and 232. In one embodiment, a steering motion may be applied to the radar-based sensor 230 to aim the sensor and direct a single source of RF energy towards one of the machines at a single point in time. This steering motion may be communicated to the radar sensor through use of motion instructions 233. In other embodiments, the radar sensor 230 provides multiple sources of energy to achieve simultaneous monitoring of multiple machines at a single point in time.

The temporal or spectral data from the sensor 230 is then transmitted as represented at 243 to a data analysis component 250. Likewise, data from the mounted accelerometers 221, 222, 223, 224 is communicated as represented by lines 241, 242, 244, and 245. The data analysis component 250 may then fuse in the data from the variety of the permanently mounted sensors 221, 222, 223, 224 and the radar-based sensor 230 to determine the status of larger machine operations as a whole, or the status of specific machine subsystems and processes, based on the comparison of data from a plurality of sensors. This may result in the generation of user indications, such as one or more recommended maintenance actions 260, the generation of health indicators 270, or other useful machine-related information.

The radar-based sensor may be configured to detect machine vibration and misbalance (such that occurring from bearing damage) at a distance without making any contact with the machine. The data produced from these remote measurements may even exceed the performance of a high-quality screw accelerometer mounted directly on the bearing enclosure.

Figure 3:
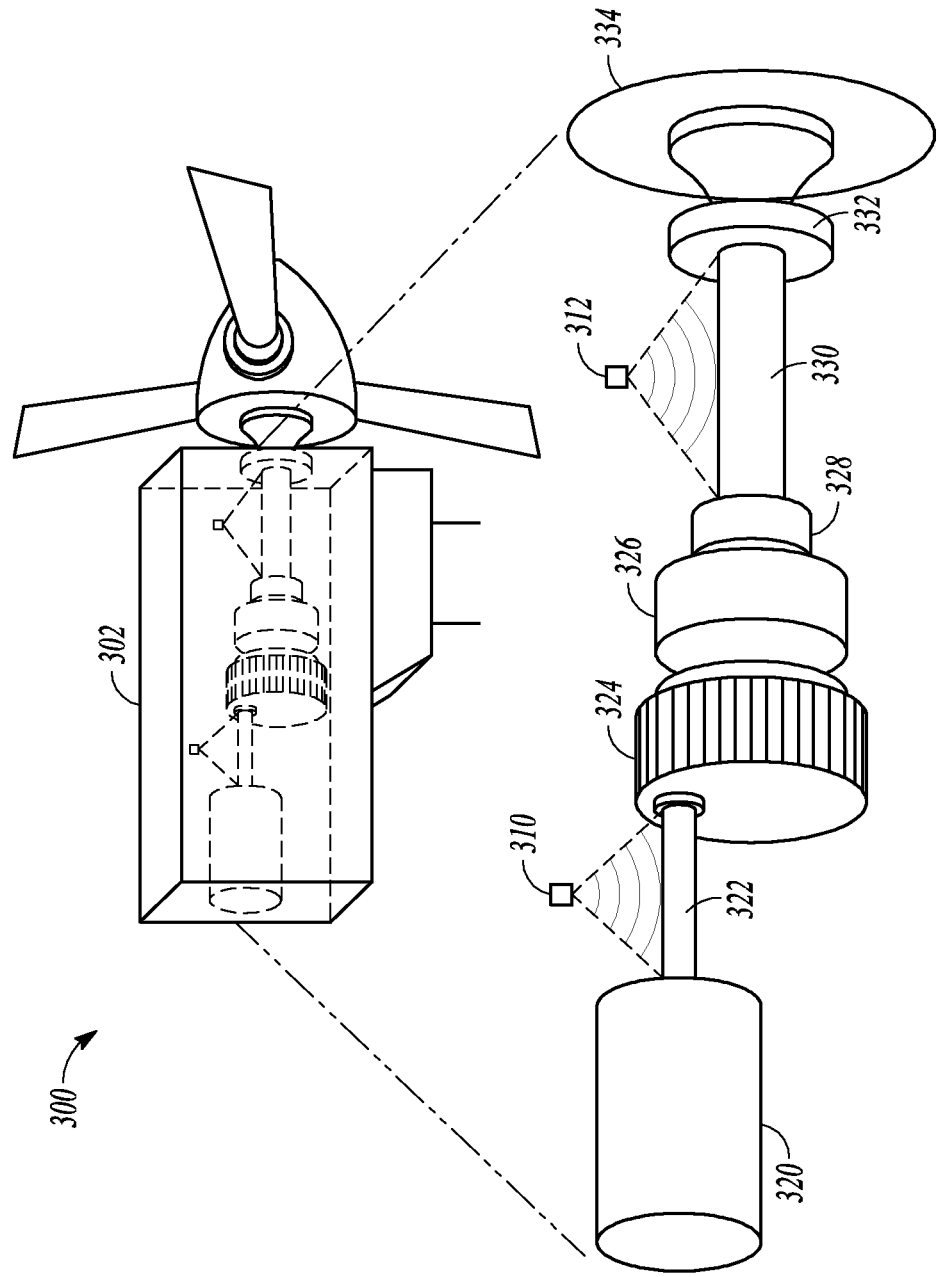
FIG. 3 depicts an example use of a sensor based system to collect data on a wind turbine gearbox.

FIG. 3 provides an illustration of an example monitoring system using a combination of radar-based and permanently mounted sensors to monitor a mechanical system, specifically a horizontal axis wind turbine 300. As depicted, a number of sensors are depicted as being used to monitor the operation of the electrical generating components of the turbine 300 within its nacelle 302.

As shown, two radar-based vibration sensors 310, 312 are placed within the nacelle 302 and adjacent to the mechanical drive used to ultimately rotate generator 320. The first radar-based vibration sensor 310 is configured to monitor the high-speed shaft 322 located between generator 320 and gear box 324. Likewise the second radar-based vibration sensor 312 is configured to monitor the main shaft 330 located between transmission 326 and hub 334, specifically the portion of the main shaft extending between bearings 328 and 332.

Further, the data from multiple sensors such as radar-based vibration sensors 310, 312 may be compared with each other in the sensing system to compare relative vibration or other harmonics that are constant in operation of the system. The data collected from the radar-based vibration sensors 310, 312 may then be transmitted from the sensors to an off-set processing system, using any of a number of wired or wireless networking data connections.

Figure 4:
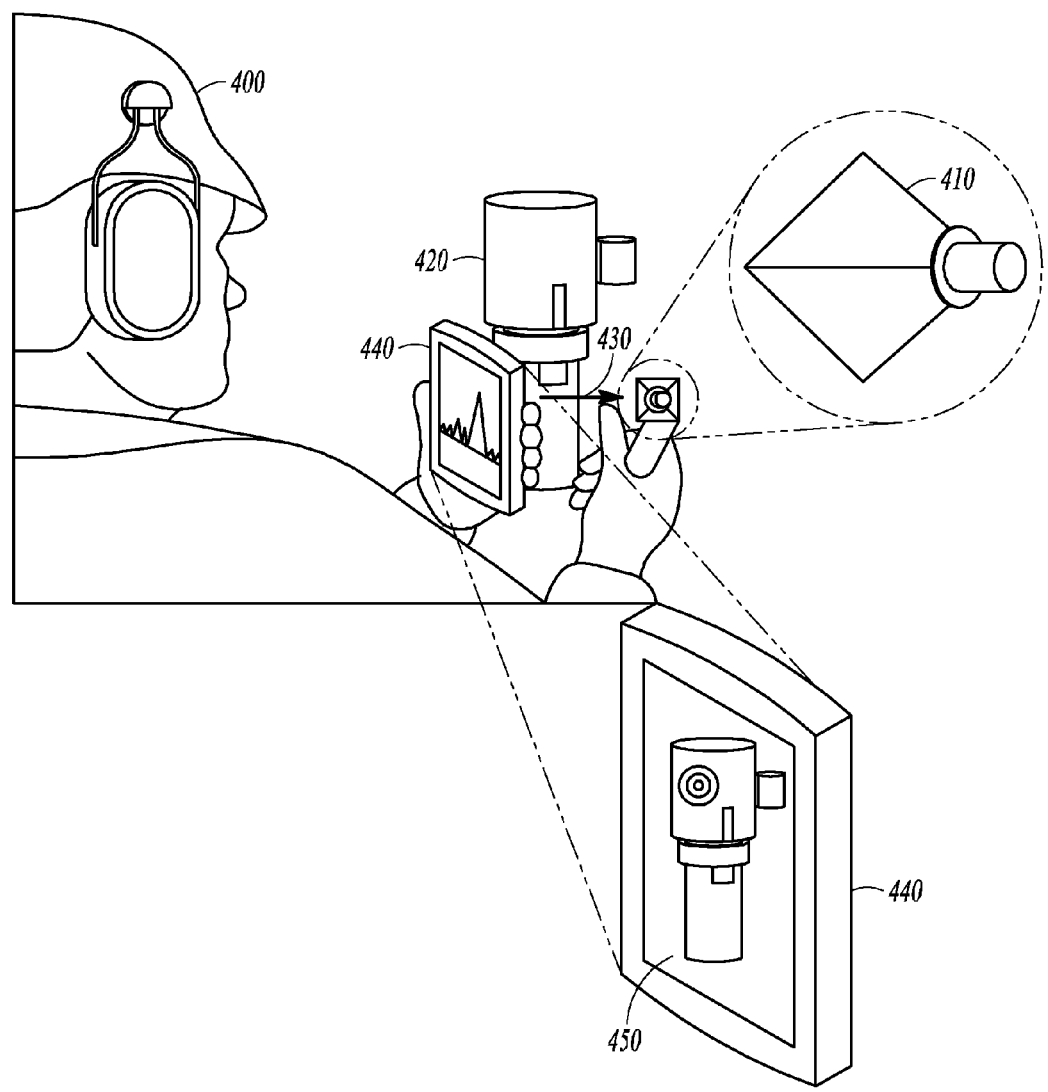
FIG. 4 depicts an example use of a sensor based system to perform real-time data analysis using a handheld vibration monitoring device.

FIG. 4 provides another illustration of use of the sensor-based system with a portable vibrometer embodiment, specifically in conjunction with a handheld inspection device. As shown, operator 400 aims a radar-based sensor 410 towards a mechanical system; illustrated here as a high-pressure pump 420 such as may be used in a large pump farm. The sensor 410 transmits and receives the RF radio signal 430 from one or more moving parts within the high pressure pump 420. The operator then uses some type of a readout display unit to assist with focusing the radar sensor and to obtain feedback.

As illustrated, the radio frequency data obtained at the radar sensor 410 may be transmitted to a computing device, here a portable handheld measurement device 440 having a display screen interface 450. In the depicted embodiment, the handheld measurement device 440 is able to process the RF signals obtained from sensor 410 and provide immediate feedback and measurements related to the sensor readings. However, the data may be transmitted from the radar sensor to another computing system, such as being transmitted from the handheld measurement device 440 using a network connection to an off-site computing system (not illustrated) for analysis and processing.

The handheld measurement device 440 may be configured to provide a visual indication 450 of the status of the sensor measurements to the operator 400. This visual indication may be presented as a graph rendered on a display screen, a textual indicator of measurements, or another illustration or indication rendered on the display screen. A variety of other graphical, textual, audio, or tactile indications may be provided to the user through the device 440 to indicate warnings, failures, and other malfunctions of the monitored equipment.

In one specific embodiment, the radar-based displacement sensor generates RF frequency at 24 GHz, an unregulated frequency band. The reflection phase changes proportionally to the displacement of the reflective surface relative to the radar divided by the RF frequency signal wavelength. The wavelength of the signal is short (e.g., 1.25 cm) for high sensitivity of the sensor. The reflected signal is modulated by the target vibration magnitude, such that any movement that is common to the target and the antenna is rejected.

Upon return to the sensor, the return signals are mixed (beat against each other) with transmitted signals. The output signal phase of the sensor follows the radial displacement (in a direction perpendicular to the antenna) of the target in the time domain. The output signal is converted in the frequency domain by Fast Fourier Transform (FFT). If the reflecting surfaces in the radar antenna's field of view move at different frequencies or amplitudes, they will contribute different spectral peaks in the sensor signal. Thus, one sensor with a wide field of view is capable of monitoring many moving parts at the same time.

The sensor, in some embodiments, may provide high sensitivity that decreases for longer distances, and may also provide an output signal that is decreasing with increased distance. For example, a sensor may be configured to detect displacement as small as 0.1 nm at a distance of 50 cm and 0.5 nm at a distance of 133.5 cm. The very high sensitivity is due to the very short round-trip time for the return signal (e.g., 3 nsec for 50 cm). Therefore, the local oscillator does not drift much and the phase noise of the sensor is very low. The round-trip time and thus the phase noise are larger for longer distances. The amplitude of the sensor decreases proportionally to the distance because the other half of the mixing energy comes from the local oscillator in the sensor and does not change with the distance. Therefore, large sensing distances are feasible for comparatively low transmission power (e.g., 50 mW).

The radar-based sensor may be used to detect higher harmonic side-bands and higher harmonics than that detected by an accelerometer. Moreover the signal-to-noise ratio (energy in the sidebands divided by the noise energy around the sidebands) may be higher for a radar-based sensor than in an accelerometer. A radar-based sensor can be tuned to wide angles or otherwise tuned to a specific field of view to monitor the entire machine or specific parts of the machine, while detecting the motion of the machinery and rejecting background vibration. Therefore, use of a radar-based sensor may have a higher probability of detecting misbalance faults than an accelerometer.

Use of the presently described radar-based sensor and sensing system may provide improvements over noncontact vibration sensing techniques based on laser technology. In some embodiments, the cost for the sensing components may be an order of magnitude lower. Some embodiments may be capable of wide field sensing with no moving parts. Further embodiments may penetrate nonconductive protection layers, and various embodiments may be made without the need for delicate optical components and connections.

The radar-based sensor and sensing system may be configured to reject the common mode vibration that may be obstructing the fault signature in machines as well as its insensitivity to surface fouling. For example, this limits optical sensors in weakly supported platforms such as a helicopter body or the gearbox in a wind turbine nacelle. In combination with the presently disclosed sensing system, warnings and other usable information can be generated and transmitted in a rapid fashion with significant advantages over existing sensing techniques.

Figure 5:
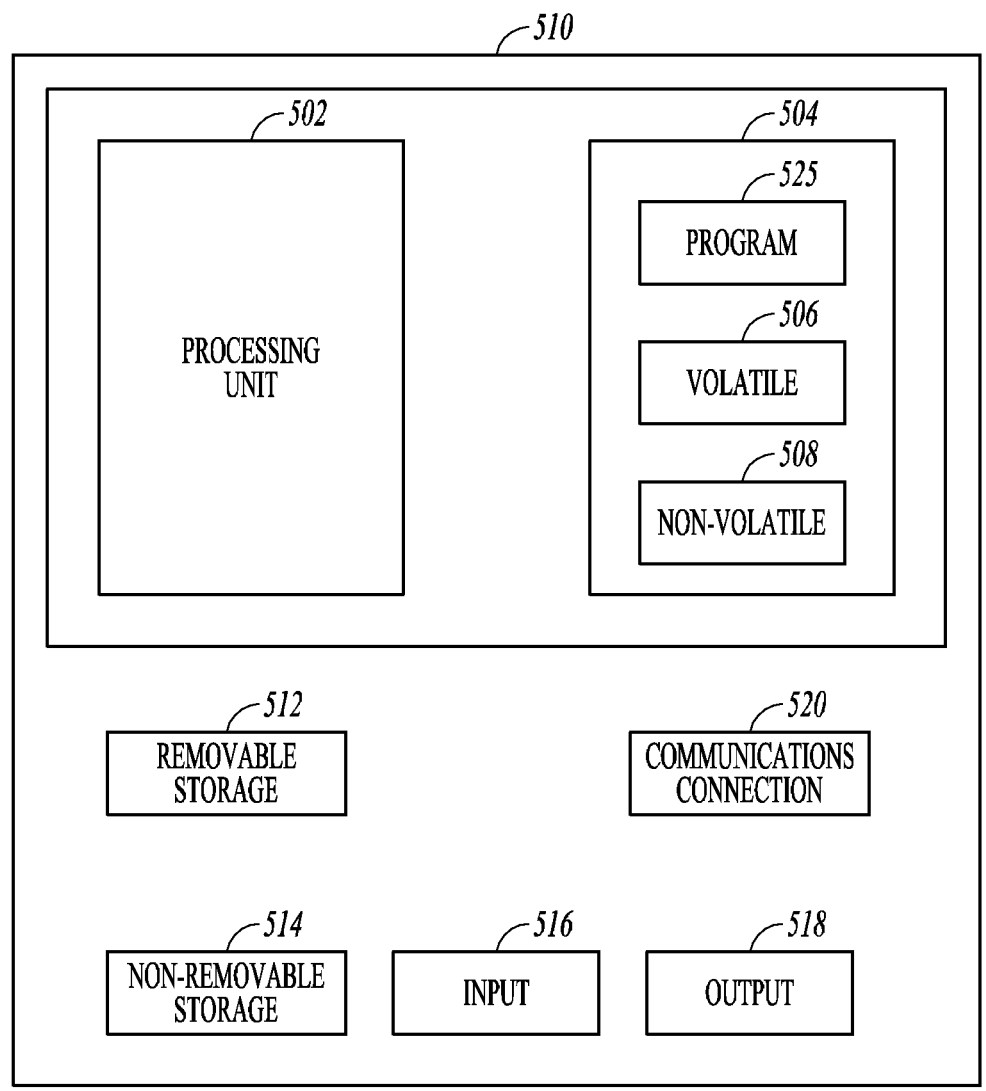
FIG. 5 depicts a block diagram of a computer system enabled to perform data analysis from various sensors.

A block diagram of an example computer system that performs data analysis from the various sensors, and includes a decision support module that calculates the machine health indicators and potential maintenance actions and executes other necessary analysis and programming is shown in FIG. 5. A general computing device in the form of a computer 510 may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers. The remote computer may include a personal computer (PC), server, router, network PC, mobile device, a peer device or other common network node, or the like. The communication connection may include a Local Area Network (LAN), a Wide Area Network (WAN) or other networks.

Computer-readable instructions to execute methods and algorithms described above may be stored on a computer-readable medium such as illustrated at a program storage device 525 are executable by the processing unit 502 of the computer 510. A hard drive, CD-ROM, and RAM are some examples of articles including a computer-readable medium. In one embodiment, a user interface is provided in connection with the computer system, such as a touch screen device for providing both input 516 and output 518.

The presently described sensing system and radar-based sensors may be implemented in a variety of settings, including but not limited to industrial and aerospace applications. Those skilled in the art would recognize that variations to the presently described embodiments may be used to apply the presently disclosed techniques to a variety of other mechanical and electromechanical applications and fields of use.

What is claimed is:

1. A sensing system comprising:
a radar-based vibration sensor, the radar-based vibration sensor configured to obtain vibration data from mechanical operation of a component in a machine of interest using radio frequency energy directed at a first location;
a vibration sensor mounted to the machine of interest, the machine mounted vibration sensor configured to obtain vibration data from mechanical operation of the component proximate to mounting at a second location; and
a processing unit configured to analyze the vibration data obtained by the radar-based vibration sensor, analyze the data obtained by the machine mounted vibration sensor, fuse the vibration data obtained by the machine mounted vibration sensor with the vibration data obtained by the radar-based vibration sensor, exclude relative vibration of the machine of interest at the first location and the second location identified in the vibration data, and provide indications related to a status of the mechanical operation of the component in the machine of interest determined from the vibration data.

2. The system of claim 1, wherein the radar-based vibration sensor is a displacement sensor transmitting radar signals using Doppler radar techniques, and wherein the vibration data includes temporal and spectral data related to the mechanical operation of the component.

3. The system of claim 1, wherein the radar-based vibration sensor is configured to detect vibrations from a plurality of different locations of the mechanical operation for the machine of interest.

4. The system of claim 1, wherein the radar-based vibration sensor provides a tunable field of view used to focus on a specific area of the mechanical operation for the machine of interest.

5. The system of claim 1, wherein the processing unit is operably coupled to a decision support module configured to calculate at least one of machine health indicators and potential maintenance actions in connection with the indications related to the status of the mechanical operation of the component.

6. The system of claim 1, further comprising:
one or more additional vibration sensors mounted to the machine of interest, the additional machine mounted vibration sensors configured to obtain vibration data from mechanical operation of additional components proximate to locations of mounting; and
wherein the processing unit is further configured to analyze the data provided by the one or more additional machine mounted vibration sensors, fuse the data provided by the one or more additional machine mounted vibration sensors with the information from the radar-based vibration sensor, and exclude relative vibration of the machine of interest at the locations of mounting determined from the vibration data of the one or more additional vibration sensors.

7. The system of claim 6, further comprising:
one or more additional radar-based vibration sensors configured to obtain vibration data from mechanical operation of additional components in the machine of interest;
wherein the processing unit is further configured to analyze the data provided by the one or more additional radar-based vibration sensors, and fuse the data provided by the one or more additional radar-based vibration sensors with the information from the machine mounted vibration sensors and the radar-based vibration sensor; and
wherein at least one of the machine mounted vibration sensors is an accelerometer.

8. A sensing system comprising:
a radar-based displacement sensor configured to collect vibration data at directed areas using radio frequency energy, the vibration data including temporal and spectral data;
multiple machine mounted vibration sensors configured to collect vibration data from regions proximate to the mounting of the vibration sensors;
a steering system configured to direct the radar-based displacement sensor to collect the vibration data from different locations of mechanical operation for a machine of interest; and
a processing system configured to analyze the data collected by the radar-based vibration sensor, analyze the data collected by the multiple machine mounted vibration sensors, combine the vibration data collected by the multiple machine mounted vibration sensors with the vibration data collected from the radar-based displacement sensor, identify relative vibration of the machine of interest in the combined vibration data, filter the combined vibration data to exclude the identified relative vibration, and provide user indications related to status of the mechanical operation for the machine of interest based on the filtered vibration data.

9. The system of claim 8, wherein the steering system directs the radar-based displacement sensor to focus radar energy at predetermined locations of the machine of interest, causing monitoring of specific components of the machine of interest.

10. The system of claim 8, wherein the steering system directs the radar-based displacement sensor to focus radar energy at additional locations of mechanical operation periodically.

11. The system of claim 8, wherein the steering system directs the radar-based displacement sensor to focus radar energy at additional locations of mechanical operation based on sensed vibrations determined within the processing system.

12. The system of claim 8, wherein the processing unit system is operably coupled to a decision support module configured to calculate at least one of machine health indicators and potential maintenance actions.

13. The system of claim 8, further comprising:
one or more additional radar-based displacement sensors configured to collect vibration data;
wherein the processing system is further configured to analyze the data collected by the one or more additional radar-based displacement sensors, and combine the vibration data collected by the one or more additional radar-based displacement sensors with the vibration data collected from the machine mounted vibration sensors and the radar-based displacement sensor; and
wherein at least one of the machine mounted vibration sensors is an accelerometer.

14. A method performed by a sensing system, comprising:
collecting a first set of vibration data from a radar-based displacement sensor, the radar-based displacement sensor being directed to measure vibrations from a region of interest on an operating machine using radio frequency energy, and the first set of vibration data including one or both of temporal and spectral data;
processing the first set of vibration data collected from the radar-based displacement sensor to analyze vibration measurements from the radar-based displacement sensor;
collecting a second set of vibration data from a multiple mounted vibration sensors configured to measure vibrations from an area proximate to the mounted vibration sensors on the operating machine, wherein the area proximate to the multiple mounted vibration sensors differs at least in part from the directed area measured with the radar-based displacement sensor;
processing the second set of vibration data collected from the multiple mounted vibration sensors to analyze vibration measurements from the mounted vibration sensors;
combining the second set of vibration data collected from the mounted vibration sensors in the area proximate to the multiple mounted vibration sensors with the first set of vibration data collected from the radar-based displacement sensor in the directed area;
identifying relative vibration in the combined vibration data;
filtering the combined vibration data that is common to the mounted vibration sensors and the radar-based displacement sensor, by excluding the identified relative vibration that is constant in operation of the operating machine;
deriving a status of mechanical operation for the operating machine from the filtered vibration data; and
providing user indications related to the status of the mechanical operation for the operating machine.

15. The method of claim 14, further comprising:
transmitting motion instructions to a steering mechanism for the radar-based displacement sensor to steer the radar-based displacement sensor and focus radar energy at a different region of interest, thereby collecting vibration information from the different region of interest on the operating machine.

16. The method of claim 15, wherein the motion instructions provided to steer the radar-based displacement sensor to focus radar energy at a different region of interest are determined based on a predetermined schedule or the status of the mechanical operation for the operating machine.

17. The method of claim 14, further comprising:
evaluating the status of the mechanical operation for the operating machine to produce one or both of suggested maintenance actions and machine health indicators; and
providing the one or both of suggested maintenance actions and machine health indicators in connection with the user indications.

18. The method of claim 14, further comprising:
collecting a third set of vibration data from one or more additional radar-based displacement sensors; and processing the third set of vibration data collected from the one or more additional radar-based displacement sensors, and combining the vibration data collected from the one or more additional radar-based displacement sensors with the first set of vibration data collected from the mounted vibration sensors and the second set of vibration data collected from the radar-based displacement sensor;

wherein the mounted vibration sensors comprise a plurality of accelerometers.

* * * * *